(12) United States Patent
Lu

(10) Patent No.: US 11,890,952 B2
(45) Date of Patent: Feb. 6, 2024

(54) MOBILE TRANSPORT FOR EXTRACTING AND DEPOSITING ENERGY

(71) Applicant: TOYOTA MOTOR NORTH AMERICA, INC., Plano, TX (US)

(72) Inventor: Norman Lu, Fairview, TX (US)

(73) Assignee: TOYOT MOTOR NORTH AMERICA, INC., Plano, TX (US)

( * ) Notice: Subject to any disclaimer, the term of this patent is extended or adjusted under 35 U.S.C. 154(b) by 108 days.

(21) Appl. No.: 16/821,951

(22) Filed: Mar. 17, 2020

(65) Prior Publication Data

US 2021/0291671 A1 Sep. 23, 2021

(51) Int. Cl.
| | |
|---|---|
| *H02J 7/00* | (2006.01) |
| *H02J 7/14* | (2006.01) |
| *B60L 53/12* | (2019.01) |
| *B60L 53/65* | (2019.01) |
| *B60L 53/30* | (2019.01) |
| *B60L 58/12* | (2019.01) |

(52) U.S. Cl.
CPC .............. *B60L 53/12* (2019.02); *B60L 53/65* (2019.02); *B60L 53/305* (2019.02); *B60L 58/12* (2019.02); *B60L 2240/622* (2013.01); *B60L 2240/72* (2013.01); *B60L 2240/80* (2013.01); *B60L 2250/16* (2013.01)

(58) Field of Classification Search
CPC ........ B60L 53/12; B60L 53/65; B60L 53/305; B60L 58/12; B60L 2240/622; B60L 2240/72; B60L 2240/80; B60L 2250/16
USPC .................................................. 320/103, 104
See application file for complete search history.

(56) References Cited

U.S. PATENT DOCUMENTS

| | | | |
|---|---|---|---|
| 7,956,570 B2 | 6/2011 | Lowenthal et al. |
| 8,154,246 B1 | 4/2012 | Heitmann |
| 8,676,636 B2 | 3/2014 | Genschel et al. |
| 8,698,642 B2 | 4/2014 | Taguchi |
| 8,796,881 B2 | 8/2014 | Davis |
| 8,860,362 B2 | 10/2014 | Kamen et al. |
| 9,024,571 B2 | 5/2015 | Uyeki |
| 9,026,347 B2 | 5/2015 | Gadh et al. |
| 9,302,594 B2 | 4/2016 | Tripathi et al. |
| 9,371,007 B1 | 6/2016 | Penilla et al. |
| 9,381,821 B2 | 7/2016 | Keeling et al. |
| 9,429,974 B2 | 8/2016 | Forbes, Jr. |
| 9,493,087 B2 | 11/2016 | Leary |

(Continued)

FOREIGN PATENT DOCUMENTS

| | | |
|---|---|---|
| AU | 2012100463 A4 | 5/2012 |
| CN | 101678774 A | 3/2010 |

(Continued)

OTHER PUBLICATIONS

EP Search Report issued in the related EP International Application No. EP21163080, dated Jul. 30, 2021.

(Continued)

*Primary Examiner* — Alexis B Pacheco

(57) ABSTRACT

An example operation includes one or more of maneuvering, by a Mobile Energy Storage Unit (MESU), to a transport that is stationary for an amount of time, that is not currently being charged, that is at a distance between the transport and the MESU and that is within a timeframe for the MESU to reach the transport, and retrieving, by MESU, a minimum amount of energy from the transport.

20 Claims, 15 Drawing Sheets

(56) References Cited

U.S. PATENT DOCUMENTS

| | | | |
|---|---|---|---|
| 9,739,844 B2 | 8/2017 | Widmer et al. | |
| 9,744,858 B2 | 8/2017 | Hall et al. | |
| 9,754,300 B2 | 9/2017 | Kempton et al. | |
| 9,778,653 B1 | 10/2017 | McClintock et al. | |
| 9,873,408 B2 | 1/2018 | Capizzo | |
| 9,881,259 B2 | 1/2018 | Forbes, Jr. | |
| 9,931,952 B2 | 4/2018 | Tripathi et al. | |
| 9,969,288 B2 | 5/2018 | Ikeda et al. | |
| 9,994,118 B2 | 6/2018 | Williams et al. | |
| 10,029,577 B2 | 7/2018 | Widmer et al. | |
| 10,252,631 B2 | 4/2019 | Ricci et al. | |
| 10,343,537 B2 | 7/2019 | Widmer et al. | |
| 10,384,775 B2 | 8/2019 | Krishnamoorthy et al. | |
| 10,414,283 B2 | 9/2019 | Kudo et al. | |
| 10,981,464 B1 | 4/2021 | Sun | |
| 11,108,090 B2 | 8/2021 | Yokoyama et al. | |
| 2007/0282495 A1 | 12/2007 | Kempton et al. | |
| 2008/0040223 A1 | 2/2008 | Bridges et al. | |
| 2008/0040295 A1 | 2/2008 | Kaplan et al. | |
| 2008/0281663 A1 | 11/2008 | Hakim et al. | |
| 2009/0085522 A1* | 4/2009 | Matsumoto | B60L 53/12 320/137 |
| 2009/0224939 A1 | 9/2009 | Stocker et al. | |
| 2011/0276448 A1 | 11/2011 | Perper et al. | |
| 2012/0025764 A1* | 2/2012 | Lee | B60L 3/12 320/109 |
| 2012/0035778 A1 | 2/2012 | Kong | |
| 2012/0109798 A1* | 5/2012 | Shelton | G07F 15/008 705/34 |
| 2012/0169282 A1 | 7/2012 | Helnerus et al. | |
| 2012/0245750 A1 | 9/2012 | Paul et al. | |
| 2012/0299373 A1* | 11/2012 | Yoshida | H02J 7/025 307/9.1 |
| 2013/0119920 A1* | 5/2013 | Hsu | B60L 53/63 320/106 |
| 2013/0166096 A1 | 6/2013 | Jotanovic | |
| 2013/0218458 A1 | 8/2013 | Scholl | |
| 2013/0342310 A1 | 12/2013 | Park et al. | |
| 2014/0167678 A1 | 6/2014 | Guillou et al. | |
| 2015/0069970 A1 | 3/2015 | Sarkar et al. | |
| 2015/0298565 A1* | 10/2015 | Iwamura | B60L 53/60 701/22 |
| 2015/0306967 A1* | 10/2015 | Cohen | B60L 3/12 701/32.3 |
| 2015/0354974 A1 | 12/2015 | Takehara et al. | |
| 2016/0075247 A1 | 3/2016 | Uyeki | |
| 2016/0288653 A1 | 10/2016 | Tsukamoto | |
| 2017/0259254 A1* | 9/2017 | Yonehana | B60L 53/24 |
| 2017/0282736 A1 | 10/2017 | Goei | |
| 2017/0355354 A1* | 12/2017 | Hassounah | B60L 53/80 |
| 2017/0358041 A1 | 12/2017 | Forbes, Jr. et al. | |
| 2018/0111494 A1 | 4/2018 | Penilla et al. | |
| 2018/0118045 A1 | 5/2018 | Gruzen et al. | |
| 2018/0143035 A1 | 5/2018 | Ricci | |
| 2018/0238698 A1 | 8/2018 | Pedersen | |
| 2018/0345807 A1 | 12/2018 | Cun | |
| 2018/0345808 A1 | 12/2018 | Cun | |
| 2019/0009756 A1* | 1/2019 | Jacobs | B60S 5/06 |
| 2019/0061546 A1* | 2/2019 | Miftakhov | H02J 7/00047 |
| 2019/0107406 A1 | 4/2019 | Cox et al. | |
| 2019/0122561 A1 | 4/2019 | Shimizu et al. | |
| 2019/0202315 A1 | 7/2019 | Wilding et al. | |
| 2019/0217735 A1 | 7/2019 | Donnelly et al. | |
| 2019/0275892 A1 | 9/2019 | Williams et al. | |
| 2019/0280509 A1 | 9/2019 | Yokoyama et al. | |
| 2019/0285892 A1 | 9/2019 | Yang | |
| 2019/0308513 A1* | 10/2019 | Akhavan-Tafti | B60L 53/32 |
| 2019/0315236 A1 | 10/2019 | Mere | |
| 2019/0337392 A1* | 11/2019 | Joshi | H01M 10/44 |
| 2020/0144838 A1* | 5/2020 | Penilla | G06Q 10/02 |
| 2020/0175614 A1* | 6/2020 | Fox | B60Q 53/11 |
| 2020/0218270 A1 | 7/2020 | Gu et al. | |
| 2020/0262305 A1* | 8/2020 | Chakraborty | B60L 53/57 |
| 2020/0276910 A1 | 9/2020 | Harty et al. | |
| 2020/0282859 A1* | 9/2020 | Shin | G06F 21/30 |
| 2020/0353839 A1 | 11/2020 | Tarchinski et al. | |
| 2021/0074094 A1* | 3/2021 | Schumacher | H04W 12/08 |
| 2021/0213846 A1 | 7/2021 | Sun et al. | |
| 2021/0213848 A1 | 7/2021 | Sun | |
| 2021/0256472 A1 | 8/2021 | Javidan et al. | |
| 2021/0291671 A1* | 9/2021 | Lu | B60L 55/00 |
| 2021/0291691 A1 | 9/2021 | Lu | |
| 2021/0331603 A1 | 10/2021 | Brombach et al. | |

FOREIGN PATENT DOCUMENTS

| | | |
|---|---|---|
| CN | 102891505 A | 1/2013 |
| CN | 101938146 B | 12/2014 |
| CN | 104520133 A | 4/2015 |
| CN | 103010040 B | 6/2015 |
| CN | 104701931 A | 6/2015 |
| CN | 105356459 A | 2/2016 |
| CN | 103915869 B | 4/2016 |
| CN | 103562001 B | 5/2016 |
| CN | 102947124 B | 2/2017 |
| CN | 108054773 A | 5/2018 |
| CN | 109398149 A | 3/2019 |
| CN | 107176041 B | 11/2019 |
| DE | 202012105091 U1 | 6/2013 |
| DE | 202010018487 U1 | 1/2017 |
| JP | 2007020397 A | 1/2007 |
| JP | 2009118652 A | 5/2009 |
| JP | 2011197932 A | 10/2011 |
| JP | 4893653 B2 | 3/2012 |
| JP | 2012120295 A | 6/2012 |
| JP | 2013104683 A | 5/2013 |
| JP | 2014056589 A | 3/2014 |
| JP | 6117868 B2 | 4/2017 |
| JP | 2017096497 A | 6/2017 |
| JP | 6190948 B2 | 8/2017 |
| JP | 2018117517 A | 7/2018 |
| JP | 6399928 B2 | 10/2018 |
| JP | 2019075134 A | 5/2019 |
| JP | 2019083528 A | 5/2019 |
| KR | 101033880 B1 | 5/2011 |
| KR | 20120062089 A | 6/2012 |
| KR | 20140078623 A | 6/2014 |
| KR | 20140109568 A | 9/2014 |
| KR | 20150079613 A | 7/2015 |
| KR | 20180091976 A | 8/2018 |
| TW | 201722025 A | 6/2017 |
| WO | 2010060720 A2 | 6/2010 |
| WO | 2011039284 A2 | 4/2011 |
| WO | 2011102857 A1 | 8/2011 |
| WO | 2012098660 A1 | 7/2012 |
| WO | 2013061410 A1 | 5/2013 |
| WO | 2013108246 A2 | 7/2013 |
| WO | 2017094431 A1 | 6/2017 |
| WO | 2018196803 A1 | 11/2018 |

OTHER PUBLICATIONS

Notice of Reasons for Rejection issued in the JP Patent Application No. 2021-042261, dated Aug. 23, 2022.

Notification of the First Office Action issued in the CN Application No. 202110279683.9, dated Apr. 15, 2023.

\* cited by examiner

150

| Transport | Current Charge (kWh) | Charging? | Time Until Next Use (hrs) | Amount of Charge Needed at Next Use (kWh) | Available Charge (kWh) | Distance From MESU (mi) | Distance From Grid (mi) |
|---|---|---|---|---|---|---|---|
| T1 | 65 | N | 6 | 30 | 35 | 0.52 | 5.86 |
| T2 | 80 | N | 5.5 | 50 | 30 | 0.59 | 5.55 |
| T3 | 75 | N | 5.25 | 60 | 15 | 1.24 | 4.74 |
| T4 | 95 | N | 3 | 40 | 55 | 1.78 | 3.04 |
| T5 | 80 | N | 6 | 60 | 20 | 1.25 | 4.58 |

Route A

MOBILE TRANSPORT FOR EXTRACTING AND DEPOSITING ENERGY

CROSS-REFERENCE TO RELATED APPLICATIONS

Cross-reference is made to the following commonly assigned U.S. patent applications being filed on the same date herewith: U.S. non-provisional patent application Ser. No. 16/821,905 entitled, "WIRELESSLY NOTIFYING A TRANSPORT TO PROVIDE A PORTION OF ENERGY"; U.S. non-provisional patent application Ser. No. 16/821,923 entitled, "DISTANCE-BASED ENERGY TRANSFER FROM A TRANSPORT"; U.S. non-provisional patent application Ser. No. 16/821,961 entitled, "EXECUTING AN ENERGY TRANSFER DIRECTIVE FOR AN IDLE TRANSPORT"; and U.S. non-provisional patent application Ser. No. 16/821,974 entitled, "TRANSPORT-BASED ENERGY ALLOCATION," each of which is incorporated by reference herein in its entirety for all purposes.

TECHNICAL FIELD

This application generally relates to a transport providing charge to an electric grid, and more particularly, to a mobile transport for extracting and depositing energy.

BACKGROUND

There may be occurrences where an electric grid, further referred to as "grid", requires excess energy. The reason many residential blackouts occur during summer is an increased use of energy. The extra power used to keep buildings cool may overwhelm the system in a given area and cause the power failures. This may be during times of high temperature, or any other condition when the managers of the electric are facing the need to perform blackouts to manage an amount of needed flow of electricity. What is needed is to provide a way to collect a surplus of energy from electric vehicles during a time of need.

SUMMARY

One example embodiment provides a method that includes one or more of maneuvering, by a Mobile Energy Storage Unit (MESU), to a transport that is stationary for an amount of time, that is not currently being charged, that is at a distance between the transport and the MESU and that is within a timeframe for the MESU to reach the transport, and retrieving, by the mobile energy storage unit, a minimum amount of energy from the transport.

Another example embodiment provides a MESU comprising a processor configured to perform one or more of maneuver to a transport that is stationary for an amount of time, that is not currently in a state of charge, that is at a distance between the transport and the MESU and that is within a timeframe for the MESU to reach the transport, and retrieve a minimum amount of energy from the transport.

A further example embodiment provides a non-transitory computer readable medium comprising instructions, that when read by a processor, cause the processor to perform one or more of maneuvering, by a Mobile Energy Storage Unit (MESU), to a transport that is stationary for an amount of time, that is not currently being charged, that is at a distance between the transport and the MESU and that is within a timeframe for the MESU to reach the transport, and retrieving, by the mobile energy storage unit, a minimum amount of energy from the transport.

DETAILED DESCRIPTION

Figure 1A:
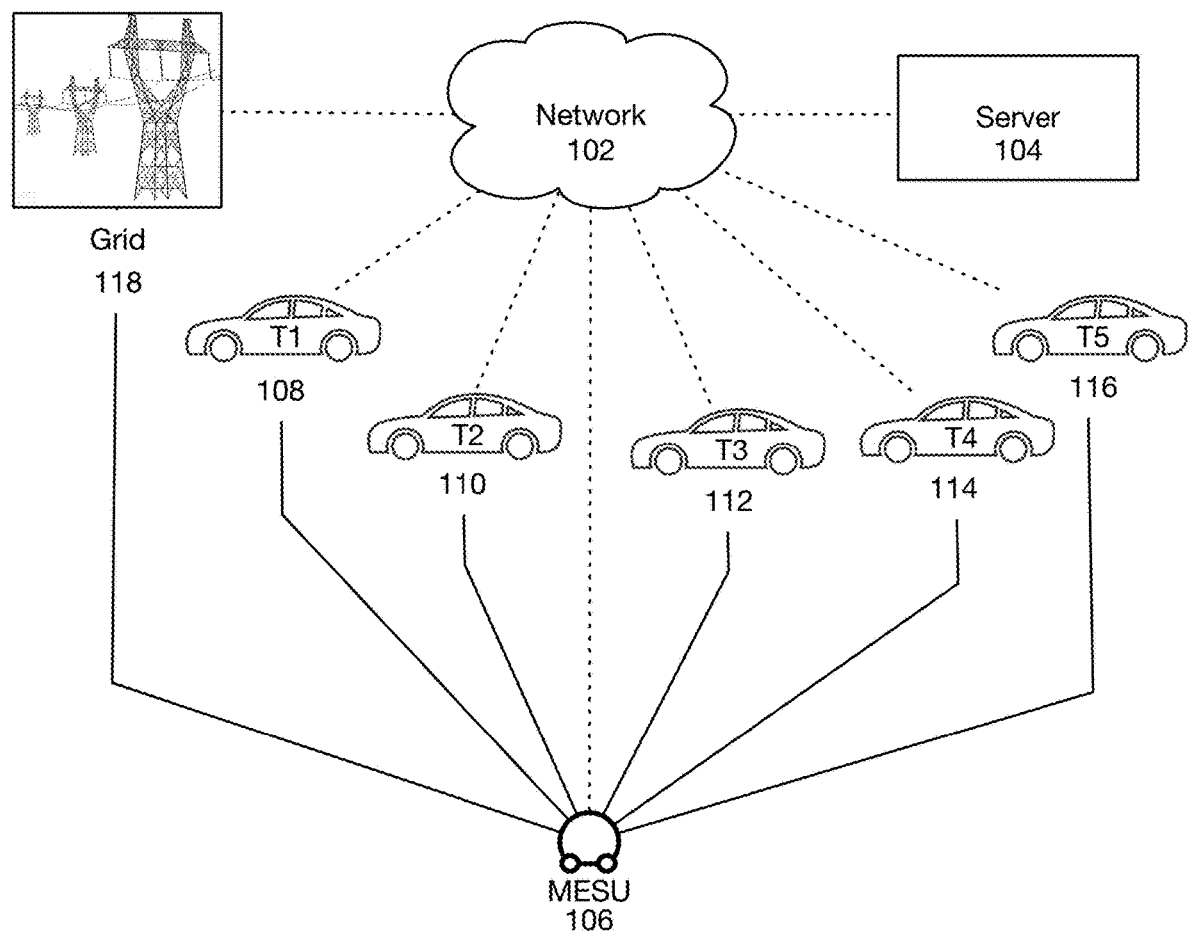
FIG. 1A illustrates a Mobile Energy Storage Unit system overview, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current solution, a transport may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system, which includes multiple nodes that communicate with each other. A blockchain is an example of a decentralized database, which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system, which can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications, which leverage tamper-proof properties of the shared or distributed ledger (i.e., which may be in the form of a blockchain) database and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors, which report sensed data to a central controller computer device in the vehicle, which in turn, is forwarded to a management server for review and action. A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Autonomous driving system utilize software and an array of sensors. Machine learning, sensors including cameras, can be utilized to allow a self-driving car to navigate.

In another embodiment, GPS, maps and other cameras and sensors are used in autonomous vehicles without lidar as lidar is often viewed as being expensive and unnecessary. Researchers have determined that stereo cameras are a low-cost alternative to the more expensive lidar functionality.

The instant solution includes, in certain embodiments, authorizing a vehicle for service via an automated and quick authentication scheme. For example, driving up to a charging station or fuel pump may be performed by a vehicle operator and the authorization to receive charge or fuel may be performed without any delays provided the authorization is received by the service station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

The grid or another area associated with the grid that stores power, in one embodiment of the current solution, communicates with a network and may be implemented through a computer associated with the grid, such that the grid computer sends a message to a server, wherein each of the grid computer and the server are communicably coupled to the network. The network may be a data network such as the global internet, or any other similar network. The message contains a request for surplus energy. The server, in one embodiment, notifies a Mobile Energy Storage Unit (MESU) of the request.

The MESU is a mobile transport that is capable of storing electric charge and is connected to the grid and/or transports via a wired or wireless connection. The MESU may be a transport that carries occupants, goods, etc., or may be a transport that is smaller in size, used primarily to store charge from other devices. The MESU may be able to travel along many different areas, in addition to a normal road, including a sidewalk, a path, and the like. In a wired connection, the electric vehicle has a charging port and may be plugged into many different types of charging stations that are broken down (in North America) into three levels: Level 1, which is the charger available to charge an electric vehicle using the standard equipment included with the transport. The chargers are plugged with one end of the charger being plugged into any standard 120 volt outlet, and the other end plugged into the transport. This type of port is capable of charging 200 km in 20 hours. Level 2 include chargers that are plugged into a 240 volt outlet and are capable of charging 200 km in about 5 hours, or 400 in about 11 hours. Level 3 chargers are solely supported by Tesla vehicles and are capable of charging 80% of 200 km in about 30 minutes or 80% of 400 km in approximately 1 hour. In a wireless connection, the transfer of charge from the transport to another object is achieved via at least two distinct methods: inductive and capacitive transfer. In inductive transfer, magnetic field coupling between multiple conducting elements is utilized to transfer energy and in capacitive transfer, electric field coupling between conducting elements are used to transfer the energy.

In one embodiment, the MESU is capable of storing a greater amount of storage than a regular electric transport. The MESU also is capable of connecting to other electric transports and receive charge from the other transports. The MESU may be autonomous, semi-autonomous, or non-autonomous.

As electric transports become more popular, the technology of generating charge while the electric transport is in motion is maturing. Currently, there are different methods wherein an electric transport can generate charge. Regenerative braking, a first discussed method, is a method where a transport will generate a charge when the transport is braking. Traditional braking systems produce friction between the brake pads and the brake rotors to slow or stop the transport. When running backwards, the motor also acts as an electric generator to produce electricity that is directed to the transport's batteries. Solar technology, a second discussed method, panel technology is being used more and more to provide power to transports, as the panels provide one of the least expensive method to charge an electric transport. Estimates show that this method can be 50% cheaper than obtaining power from the grid.

In one embodiment, the server informs a MESU of a need for surplus energy. The MESU determines a route to obtain surplus energy from transports, then deliver the stored energy to the grid, via a device such as a vehicle power conversion unit, further described below. The MESU travels along a path, gathers and stores energy from other transports then transfers the energy at another location, such as a charging station associated with the grid, to be placed into the grid. This MESU, being mobile in nature, allows for the gathering and storage of energy from other transports without requiring the transport to be moved. The MESU and/or the server determines a route to obtain energy from transports that have a surplus energy while traveling the shortest distance between the transports.

In one embodiment, the MESU gathers energy from transports that have an excess of energy, such as those transports that may generate energy at the transport and are not plugged into the grid charging. In another embodiment, the MESU will obtain charge from other transports, and provide the energy to one or more of other transports, and the grid at another time, such as when the grid will require surplus charge.

Data from the transports are sent to a system of the current application either when requested or at predetermined intervals. The data comprises the current charge of the transport, whether the transport is currently plugged in, an approximate time that the transport will next be used and an amount of stored energy at that time, and an amount of energy required at that time, the distance from the current location of the MESU, and the distance to the grid. The amount of available charge for a transport is determined as follows: (Amount of Charge at Next Use)−(Amount of Charge Needed at Next Use)

FIG. 1A illustrates a Mobile Energy Storage Unit system overview 100, according to example embodiments. A server 104 communicably coupled to a network 102 is used to determine, among other things, an optimal path for a MESU 106 to travel and gather and store the greatest amount of energy in a minimal amount of time, in one embodiment. The transports in the system T1-T5 108-116, the grid 118, and the MESU 106 are connected to the network 102. The grid 118 refers to a station associated with an electric grid and is capable of receiving a charge from an object (wired or wirelessly), such as a transport or MESU. Additional or fewer transports other than those depicted may be part of the system without deviating from the scope of the current application.

The MESU 106 is a transport that can store energy containing at least one connection port, allowing a connection to different transports to gather and store energy. The MESU 106 has a connection to the network 102, allowing it to transfer and receive data such as notifications and requests.

The MESU 106 connects to the transport(s) via a connection port, as is usually utilized to charge electric vehicles. In one embodiment, a vehicle power conversion unit in the MESU manages the flow of energy as it is connected to other sources to obtain energy, and to the grid to distribute energy. A controller on the MESU is used to control the amount of energy flowing in and out of the MESU. The MESU 106 communicates with the network 102, wherein communication includes instructions of the amount of permissioned energy to obtain.

The transports 108-116, MESU 106, and the grid 118 are connected to a network 102 such as a global network or Internet via a suitable wireless communication protocol, such as a wireless telephony (e.g. GSM, CDMA, LTE, etc.), Wi-Fi (802.11 standards), WiMAX, Bluetooth, infrared or radio frequency communications, etc. A server is communicably coupled to the network, which is used, among other functions, to store data from the elements of the system, such as the transports, the grid, and the MESU, in one embodiment. Additional code in a processor associated with the server may in executed to perform requests and generate responses, to other elements in the system, such as the grid 118, the transports 108-116, and the MESU 106. A database (not depicted) may be communicably coupled to the server 104 to store data about the functions of the current system.

The transports 108-116 send data to the server 104 via the network 102 at predefined intervals, in one embodiment. The data includes information about the use of the transports, idle time, current and predicted charge levels, as well as information about the future use of the transport, such as upcoming events and scheduled appointments. In one embodiment, the transports 108-116 and/or the server 104 interface with Application Programming Interfaces (APIs) of a calendar application associated with occupants of the transports 108-116 to determine upcoming, scheduled events on the driver/occupants calendar. Querying a calendar application via APIs, the system can determine if there are any irregular destinations upcoming. The system also determines regular routes and regular times by recording daily routes of the transport. Therefore, it can determine how long the transport may be parked at a particular location, and an approximate time when the transport will be in use. The MESU 106 connects to the transports 108-116 to transfer and store any surplus energy in the transports.

In a further embodiment, the system receives data about the grid such as days when the grid will, at a predetermined time, submit data about needs for surplus energy. In another embodiment, the system queries the grid, such as via the interfacing with APIs therein.

Figure 1B:
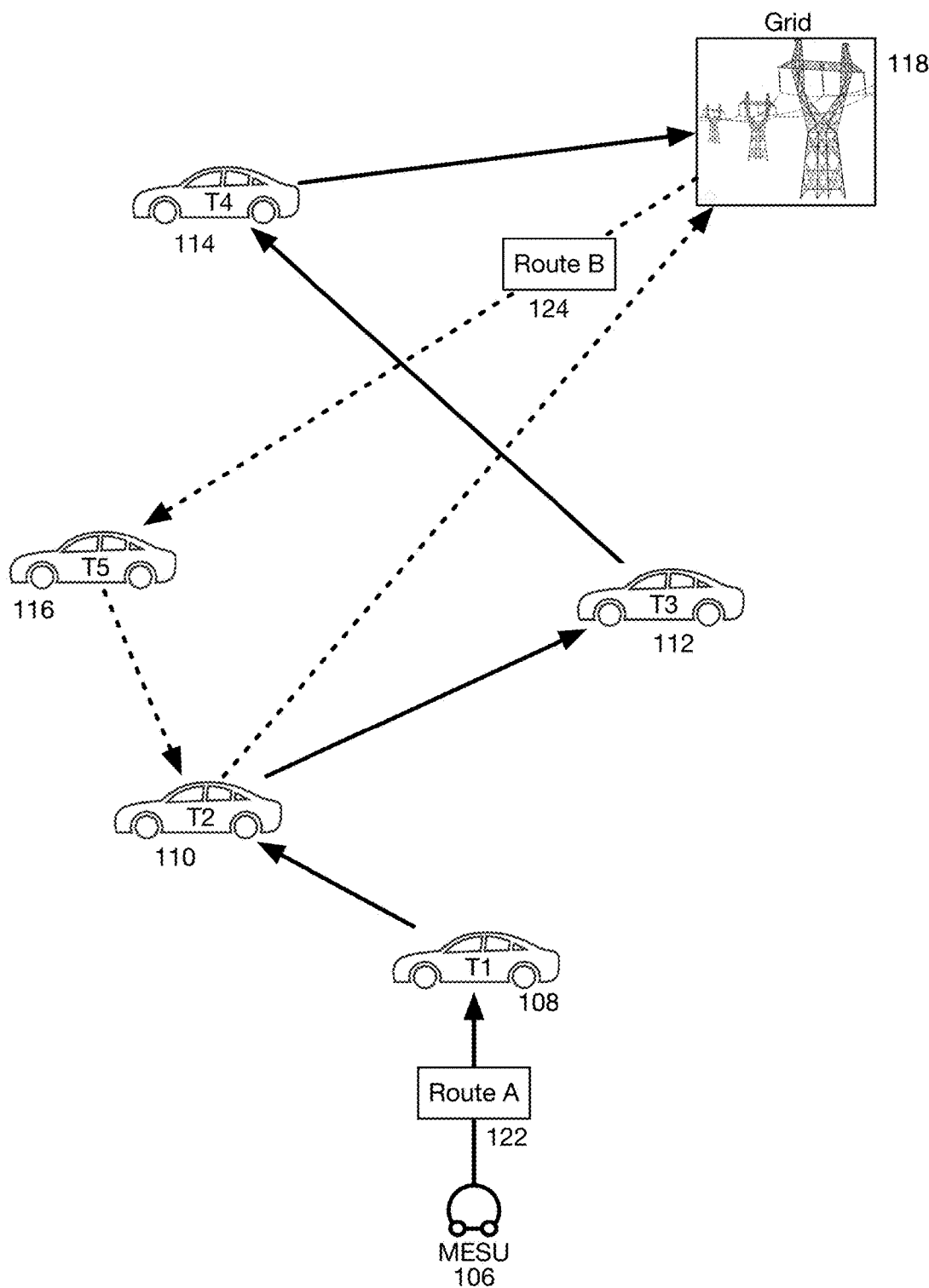
FIG. 1B illustrates a Mobile Energy Storage Unit routing example, according to example embodiments.

Now referring to FIG. 1B, a MESU routing example 120, according to example embodiments. A MESU 106 obtaining surplus charge from transports and transferring the stored energy to a grid. In conjunction with the server 104, the MESU 106 determines a route that will obtain a maximum amount of charge from transports then discharge the stored charge at a grid 118. The determination of the route is based on multiple factors that are described herein.

In one embodiment, the MESU will examine transports that are not plugged in and have surplus charge to provide back to the grid. This may be a surplus of charge in the transport, wherein the transport is not needing the additional charge to arrive at their next destination. The surplus charge may be from the transport generating additional charge from different methods, such as regenerative braking, solar power charge, and/or the like. To determine how much charge the transport will need after any surplus charge has been taken (referred herein as "remaining charge"), the MESU 106, in one embodiment, communicates with a server 104. The server 104 communicates with the transports, as further described herein, to determine an amount of surplus charge in the respective transports. The MESU 106 creates a route according to which transport are available, are in proximity to the MESU 106, and have a surplus of charge to provide to the MESU 106.

In another embodiment, the server 104 will adjust the remaining charge according to the current environment, such as current traffic and/or weather on the route to the transport's next destination. Also, the condition of the transport and the like may be used to assist the server 104 to determine the remaining charge.

As an example, the MESU 106 follows Route A 122, transport 1 (T1) 108 is the nearest to the MESU, not charging, and has 35 kWh available as surplus to provide to the MESU. Therefore, the MESU will make that transport the first stop. The MESU 106 then travels to transport 2 (T2) 110, transport 3 (T3) 112, transport 4 (T4) 114, then to the grid 118 to provide the stored charge back to the grid. The MESU 106, after each transfer of charge may (in one embodiment) query the server 104 for the most up-to-date characteristics of the transports in proximity to the MESU 106. The server 104 will then return with a next transport on the route.

The MESU 106 in correspondence with the server 104 determines transports that have surplus charge and determines Route B 124 where it travels to transport 5 (T5) 116, then to transport 2 (T2) 110, the back to the grid 118. In another embodiment, the MESU 106 determines the remaining charge itself.

Figure 1C:
FIG. 1C illustrates a routing table example, according to example embodiments.

Now, referring to FIG. 1C, a routing table example 150, according to example embodiments including a table of transport data 152. This data is sent to the server 104, in one embodiment, wherein the server 106 will have data for each transport and have the ability to determine any available surplus charge. This surplus charge is provided to the MESU 106. In some embodiments, the server 104 recommends a route for the MESU 106, such that the MESU 106 will follow the route provided and make stops at each respective transport 108-114. The MESU 106 will then travel to the grid 118 to unload the stored charge and continue on its next route.

In a further embodiment, when the MESU 106 stops at a transport to obtain surplus charge, an amount of time is passes while the charge is transferred. Each time the MESU 106 continues on the route (such as after obtaining surplus charge from a transport) the MESU 106 queries the server 106 for data related to the up-to-date route, since an amount of time has passed and there may be modifications to the data and other transports, and therefore modifications to the route.

The table 152 depicts the current charge of the transport, whether the transport is currently being charged, an amount of charge determined to be necessary at the transport's next use, an amount of surplus charge that is available, and the geographic distances, both the distance from the MESU's current location, and the geographic distance between the transport and the electric grid.

In one embodiment, when the MESU 106 is traveling from transport to transport obtaining surplus charge, the MESU is not always traveling on a street or road, but travels on a bike lane, a sidewalk, path or the like. These are locations where a normal transport does not normally travel. The MESU 106 provides a capability to augment views, such as augmenting the street view of the geographic area. This additional view provides additional periphery to a current street view. Additional information of the area is also provided, such as a sidewalk needing repairs, a lawn that is need of maintenance (such as through disease, parasites, additional maintenance due to current water restrictions, broken sprinkler heads that need repair, etc. Furthermore, additional information is provided about packages left on a front area of a building, such as a porch. Current street views provide a view of the area yet are unable to provide more details of the location. With the current embodiment, further details are provided, as well as a more detailed peripheral view of the location. This additional data is used to provide delivery personnel specific locations to leave packages, such as behind a planter, or behind a bush, for example.

In one embodiment, the MESU will only take energy from a transport that needs a greater amount of energy to operate as compared to the MESU. For example, the MESU would not take energy from a transport such as a scooter, a golf cart, a motorcycle, and the like.

In one embodiment, each transport in the network has opted into an agreement to provide details to a server wherein the details are provided at regular intervals such that the server can retain an understanding of the relatively up-to-date details of the transport. The details may include whether the transport is currently plugged into a charging station, whether the transport is moving, how long the transport has not been moving, the geographic location of the transport, and the time of day.

In one embodiment, the MESU pings the transport to determine if the transport is currently in motion and how long the transport has not been in motion (if not currently in motion). A computer associated with the transport is in communication with the MESU and provides this information. In another embodiment, the transport is in communication with a server such as through a global network such as the internet. The MESU communicates with the server to determine characteristics of the transport in the network.

In one embodiment, the MESU scans transports within the network within a geographic area. The MESU queries the server to obtain details of transports in the network within the geographic area. The MESU determines, through the response from the server, which transports are in the network within the geographic area and have a surplus of charge to provide to the MESU.

In one embodiment, the MESU determines the availability of the transports within the area. For example, those transports that are geographically located in a parking lot of business are not available, as the MESU will not be able to park at the transport and avoid impeding traffic in the parking lot. Those transports that are currently located inside a parking garage also would not be available to provide charge. Those transports that are located near a charging station are considered unavailable, as they may be plugged into the charging station.

In one embodiment, the MESU accounts for periods in the day. The day is broken up into periods, such as period 1 being from 8 am to 11 am, period 2 being from 11 am to 1 pm, period 3 being from 1 pm to 6 pm, and period 4 being from 6 pm to 11 pm. If a transport is not near a charging station, parked in an accessible area (such as at a parking lot of a corporate business or the like) and has a surplus of charge, the period of the day is taken into consideration in the determination of the availability of the transport. For example, a transport should remain parked if at the beginning of periods 1 and 3. A transport in period 2 is not considered available as the transport may soon be utilized, such as the situation where the operator of the transport is on a lunch break. If the MESU is querying transports at the end of period 1 and 3, then those transports may soon be used, such as the situation where the person may be heading to a destination during a lunch break, for example. If a transport is parked at a parking lot at the beginning of period 4, then it has a higher probability to be used, as the operator of the transport may be at dinner, or shopping. In further embodiment, if the transport is parked at a movie theater, and has been idle for a short amount of time (such as 10 minutes), that transport would be considered to be available, as it is most probable that the operator is watching a movie.

In one embodiment, the MESU determines when it needs to stop transferring charge from a transport. If the MESU is at a transport transferring charge from the transport, if the operator of the transport arrives at the transport during this time, the MESU will stop the transfer upon a determination that the transport is going to be driven. In one embodiment, one or more biometric elements are placed on the MESU such that the operator may interact with the one or more elements, allowing the MESU to validate that the person is the operator of the transport. This informs the MESU to disconnect from the transport and continue to another location. In another embodiment, the MESU, through communication with a computer associated with the transport, can detect functions of the transport and determine that the transfer should cease. Such as a determination that the driver's door opened and or closed, a seat belt was used to strap an occupant into the transport, an instruction to initiate the transport, and the like.

In one embodiment, the MESU, through additional elements, can bypass the conditions of stopping the transport. The additional elements may include an audio component wherein the operator can instruct the MESU to continue regardless of the functions being performed at the transport that would normally stop the transfer. In a further embodiment, the operator may "call out" to the MESU once it disconnects and begins to a next destination. Such as the operator saying a command, such as "don't disconnect", or "continue the transfer", and the like. In another embodiment, the MESU accepts gestures to communicate actions. An operator may perform a predefined gesture to instruct the MESU to stop a transfer.

In one embodiment, the MESU contacts an operator of the transport such as via direct communication via cellular mobility, or through V2V technology or the like. The MESU informs the operator of details related to the desired transaction, such as the expected amount of time until the MESU arrives at the transport, an estimated amount of time it will take to transfer the charge, an estimated amount of charge desired, and an estimated time when the transfer will be complete. In yet another embodiment, the MESU requests a verification that the transfer can take place. The operator, such as via a mobile device associated with the operator, may either validate the response, or deny the response. In yet another embodiment, the operator, through the device, can respond with a time when the transfer may take place. In a further embodiment, the MESU notifies the device associated with the operator of a transfer of value to the operator in response to the allowance of the MESU to transfer charge from the transport.

In one embodiment, periods during the day are established. These periods are used by the MESU to determine a likely availability of transports. For example, three periods are defined: a time between 8:00 am and 11:00 am (Period 1), a time between 1:00 pm and 5:00 pm (Period 2), and a time between 6:00 pm and 10:00 pm (Period 3). By using the periods, the MESU can predict a higher chance that a transport will be available for a charge transfer. If the current time is between 8:00 am and 9:00 am, the transport is not connected to a charging station, and is in an available parking spot, there is a fairly high chance that the transport will be available until 11 am. This reflects a normal schedule of a working professional where the transport is used to route to a business, the park until it is possibly used to travel to a restaurant. The transport routes back to the business until a time later in the afternoon when it is used to route back to a residence. A MESU is better able to predict an availability of a transport using these periods.

In one embodiment, the MESU considers an average charging rate and a peak charging rate and the amount of time at the average charging rate and the peak charging rate for determining which charging station to maneuver to, low long to stay at the charging station, how much charge is to be remaining in the MESU upon leaving the charging station, etc. The average charging rate is the rate of charge over a given period, and the peak charging rate is the fastest charging kWh over the charging session.

Figure 2A:
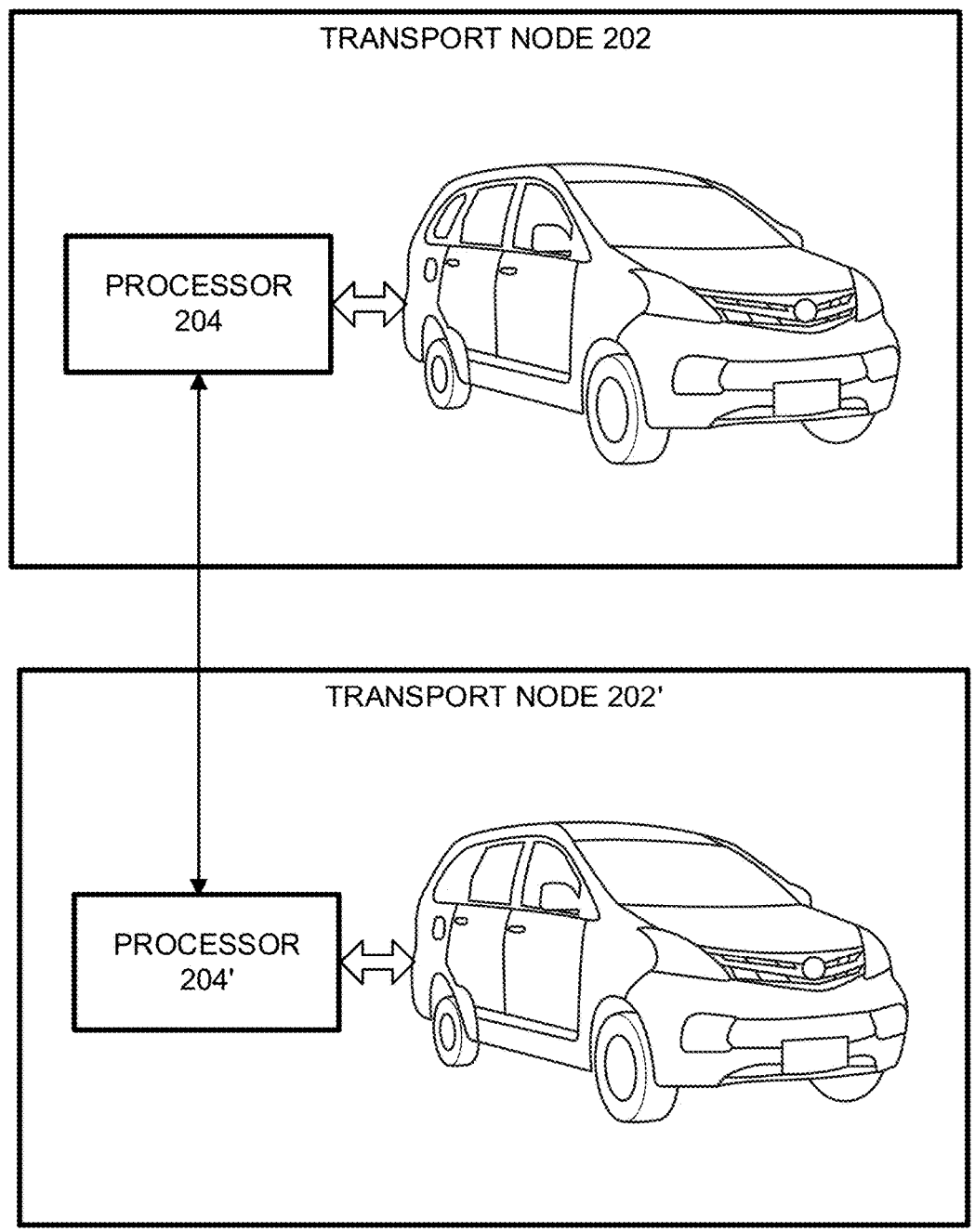
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
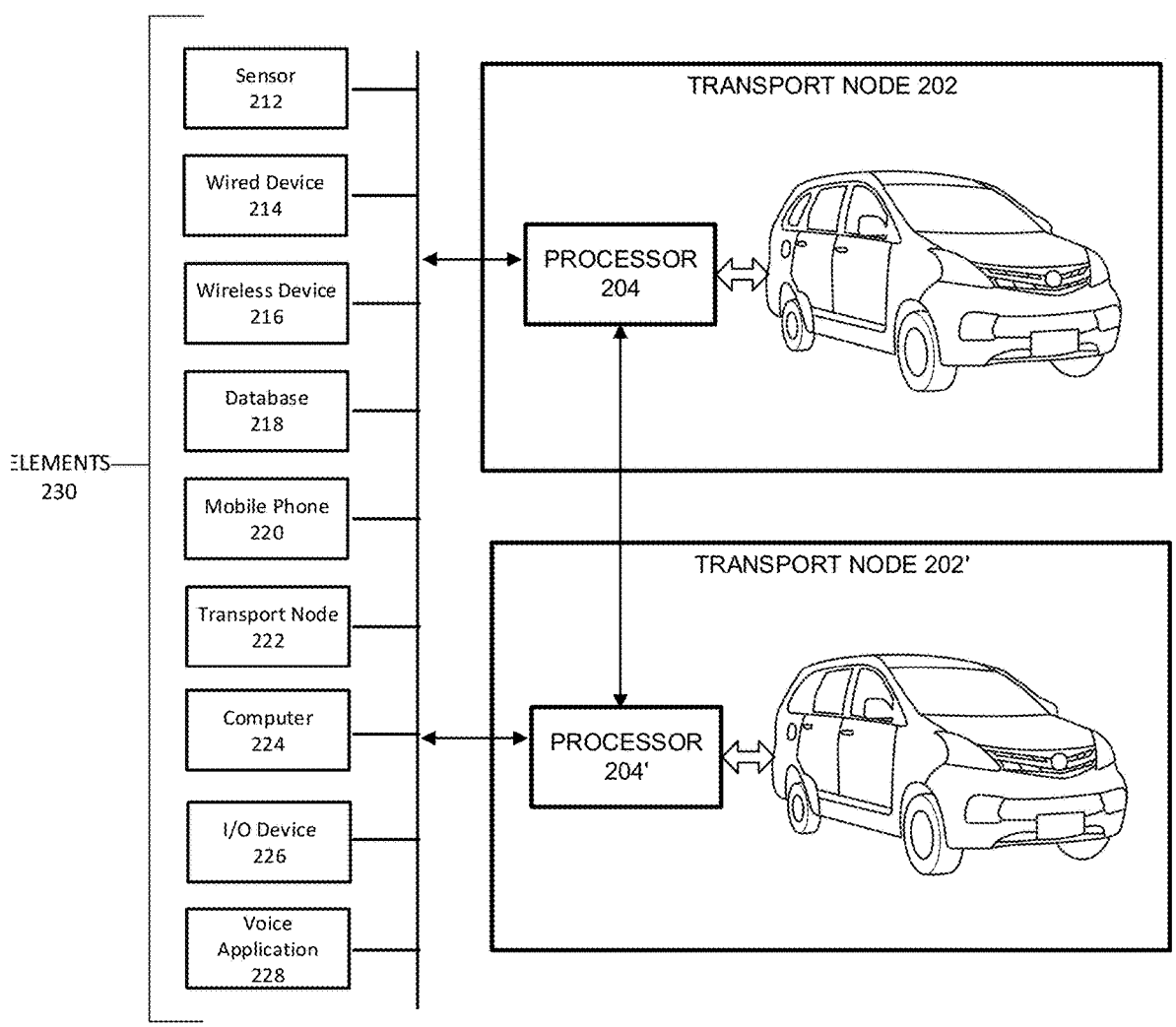
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204, which may initiate the transport node 202 to take an action, may further provide the information or additional information to the processor 204', which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
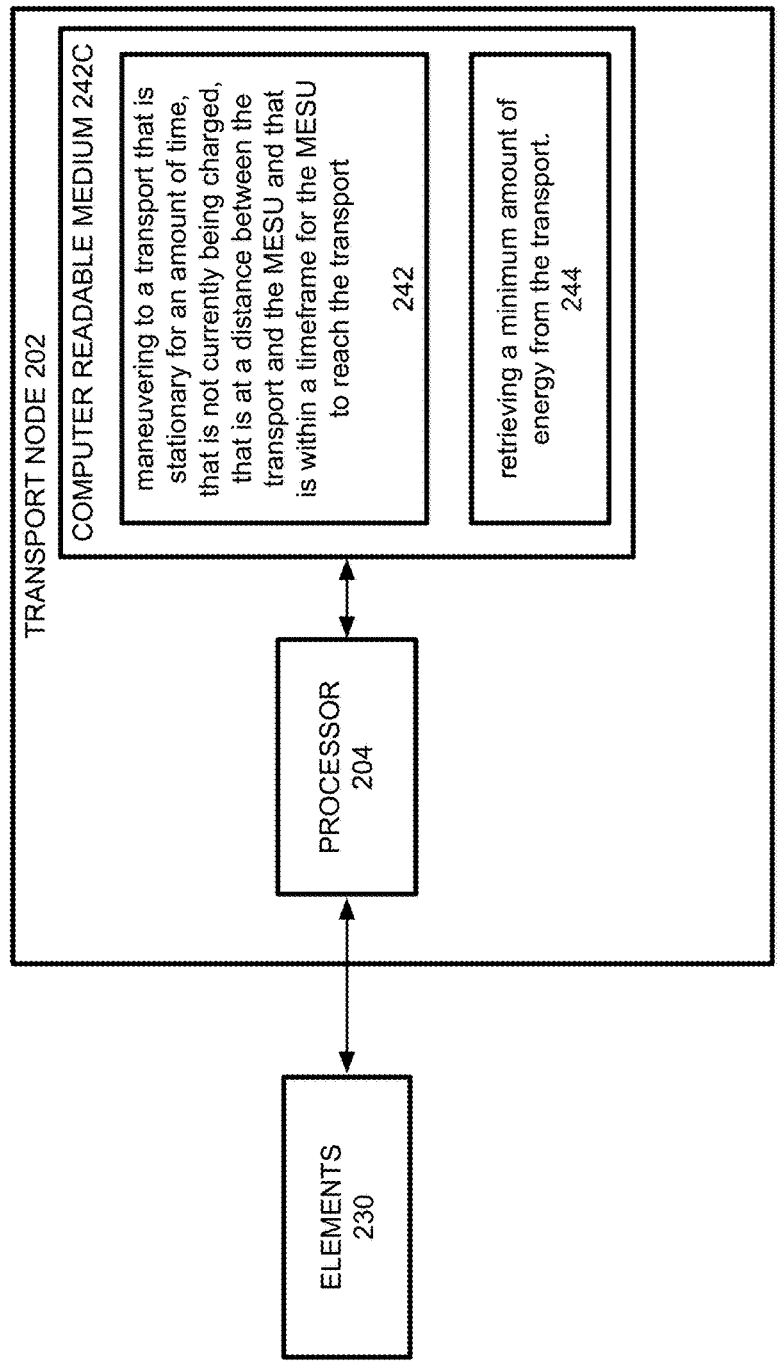
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of maneuvering, by a Mobile Energy Storage Unit (MESU), to a transport that is stationary for an amount of time, that is not currently being charged, that is at a distance between the transport and the MESU and that is within a timeframe for the MESU to reach the transport 242, and retrieving, by the mobile energy storage unit, a minimum amount of energy from the transport 244.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 3A:
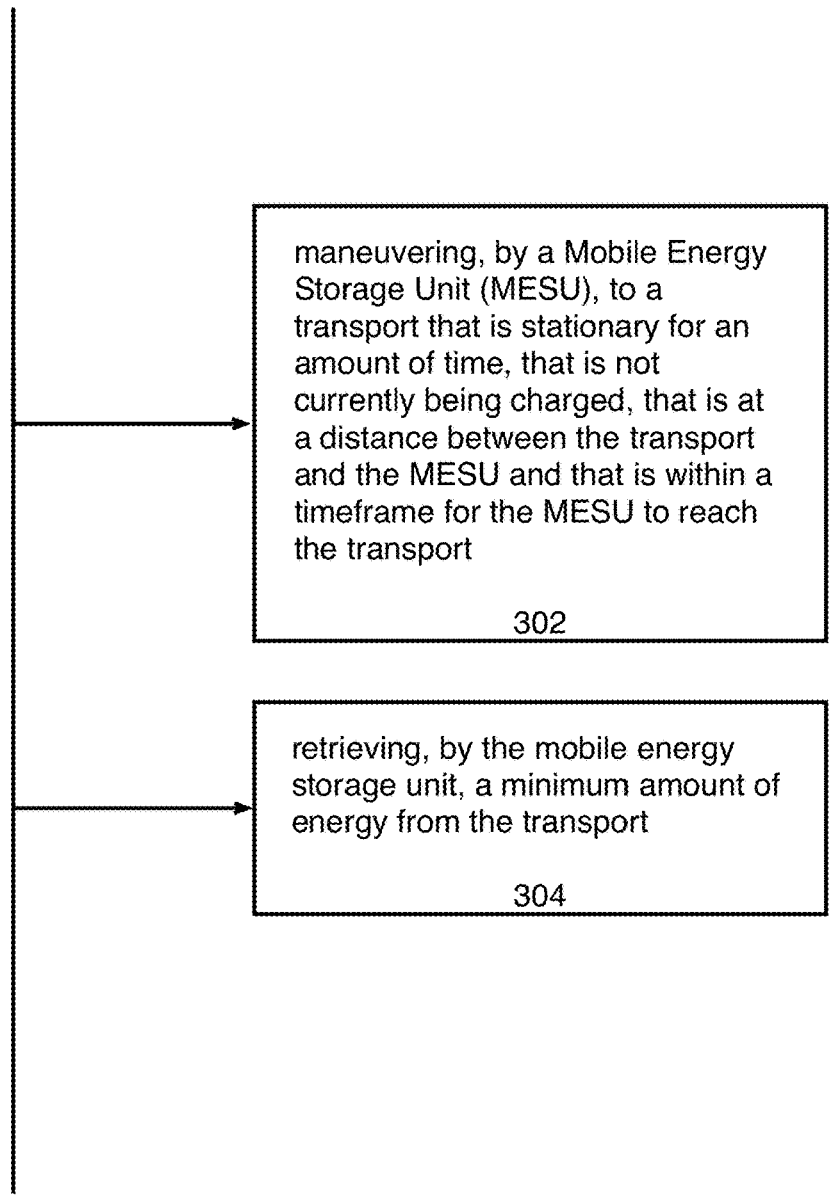
FIG. 3A illustrates a flow diagram, according to example embodiments.

FIG. 3A illustrates a flow diagram 300, according to example embodiments. Referring to FIG. 3A, the flow comprises maneuvering 302, by a Mobile Energy Storage Unit (MESU), to a transport that is stationary for an amount of time, that is not currently being charged, that is at a distance between the transport and the MESU and that is within a timeframe for the MESU to reach the transport, and retrieving 304, by the mobile energy storage unit, a minimum amount of energy from the transport.

Figure 4:
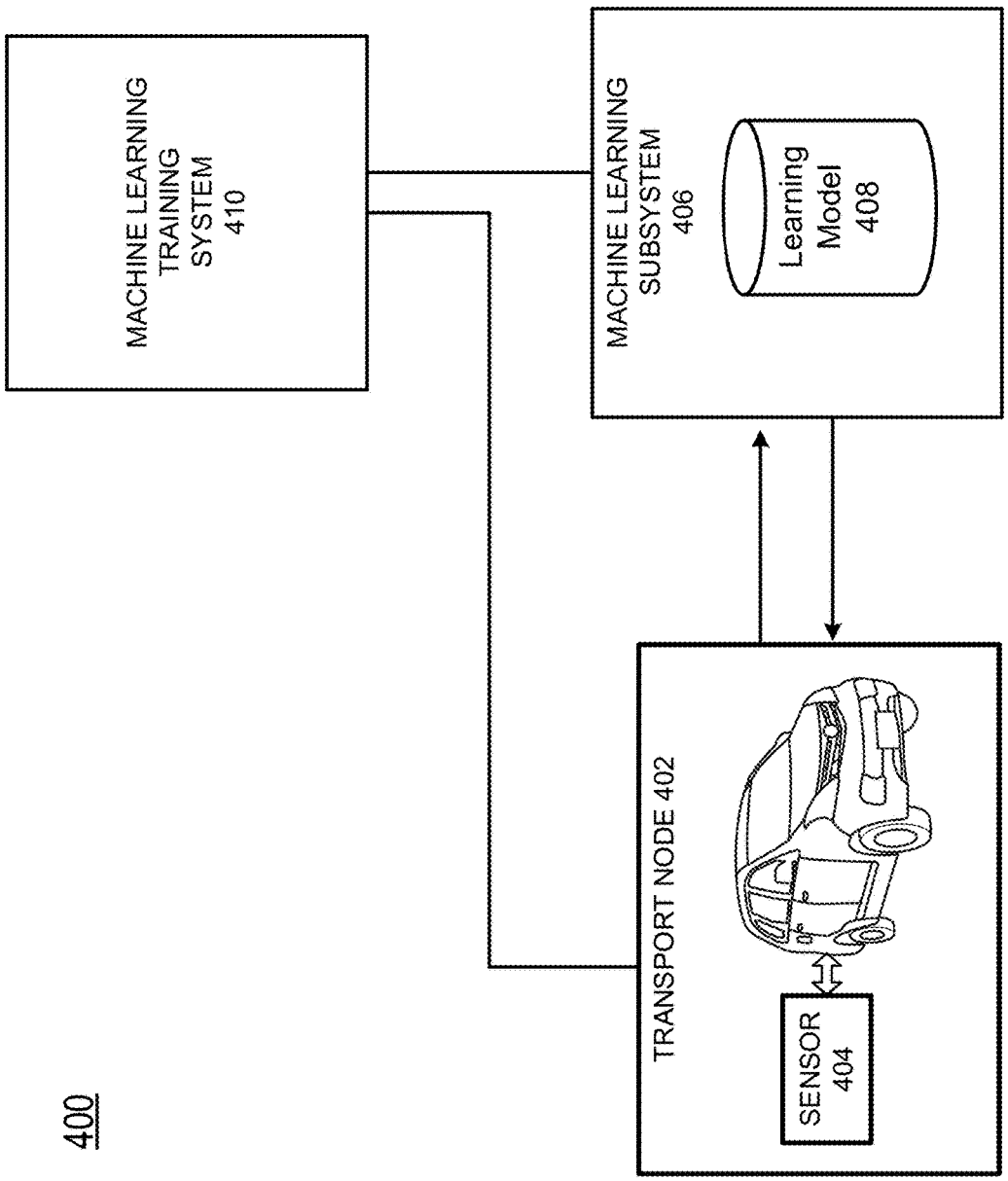
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408, which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408, which returns one or more predictions. The machine learning subsystem 406 sends one or more instructions to the transport node 402 based on the predictions from the learning model 408.

In a further embodiment, the transport node 402 may send the one or more sensor data 404 to the machine learning training system 410. In yet another embodiment, the machine learning subsystem 406 may send the sensor 404 data to the machine learning training subsystem 410. In one embodiment, the machine learning subsystem 406 and the machine learning training subsystem 410 may be one system. One or more of the applications, features, steps, solutions, etc., described and/or depicted herein may utilize the machine learning network 400 as described herein.

Figure 5A:
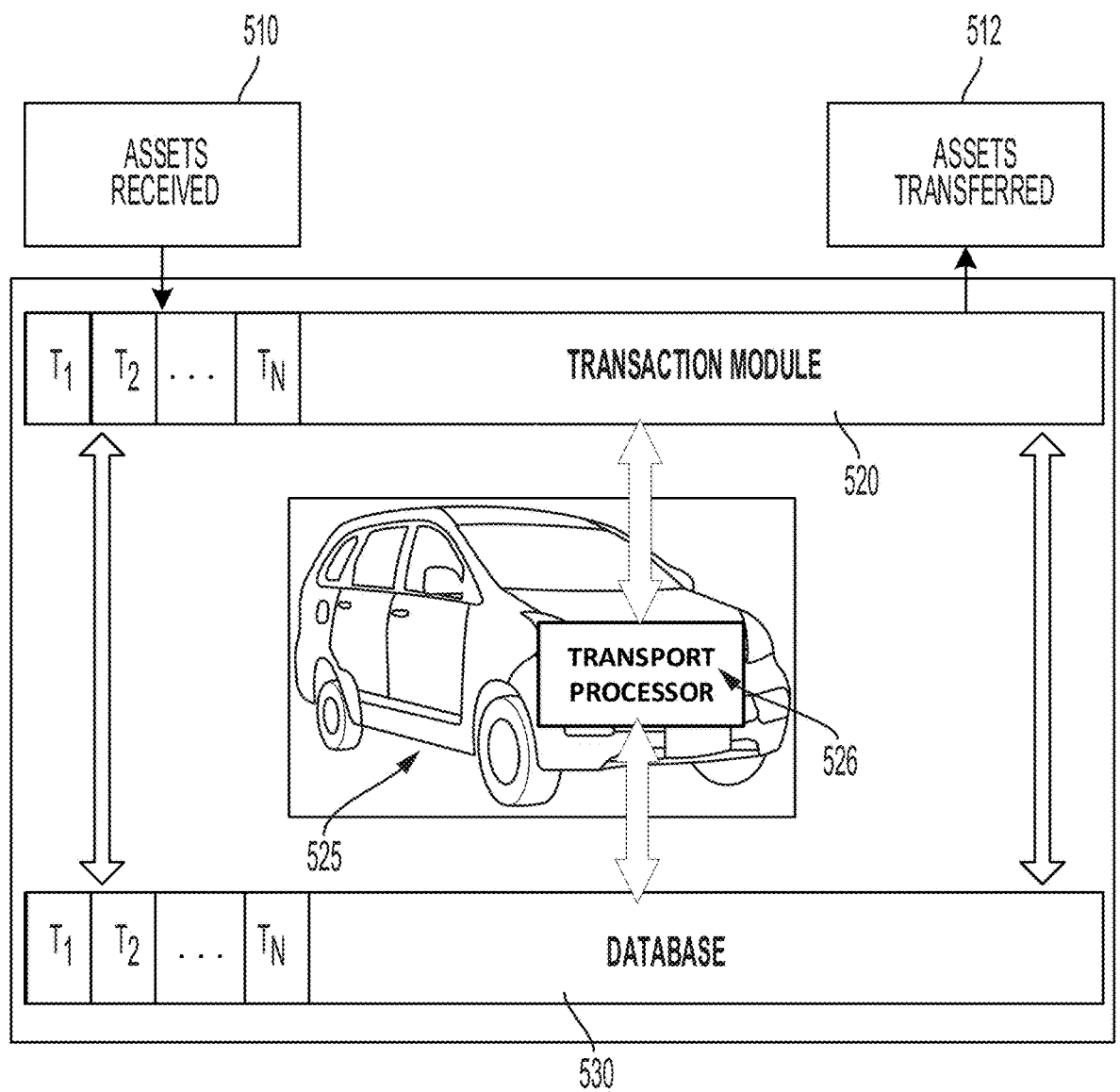
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
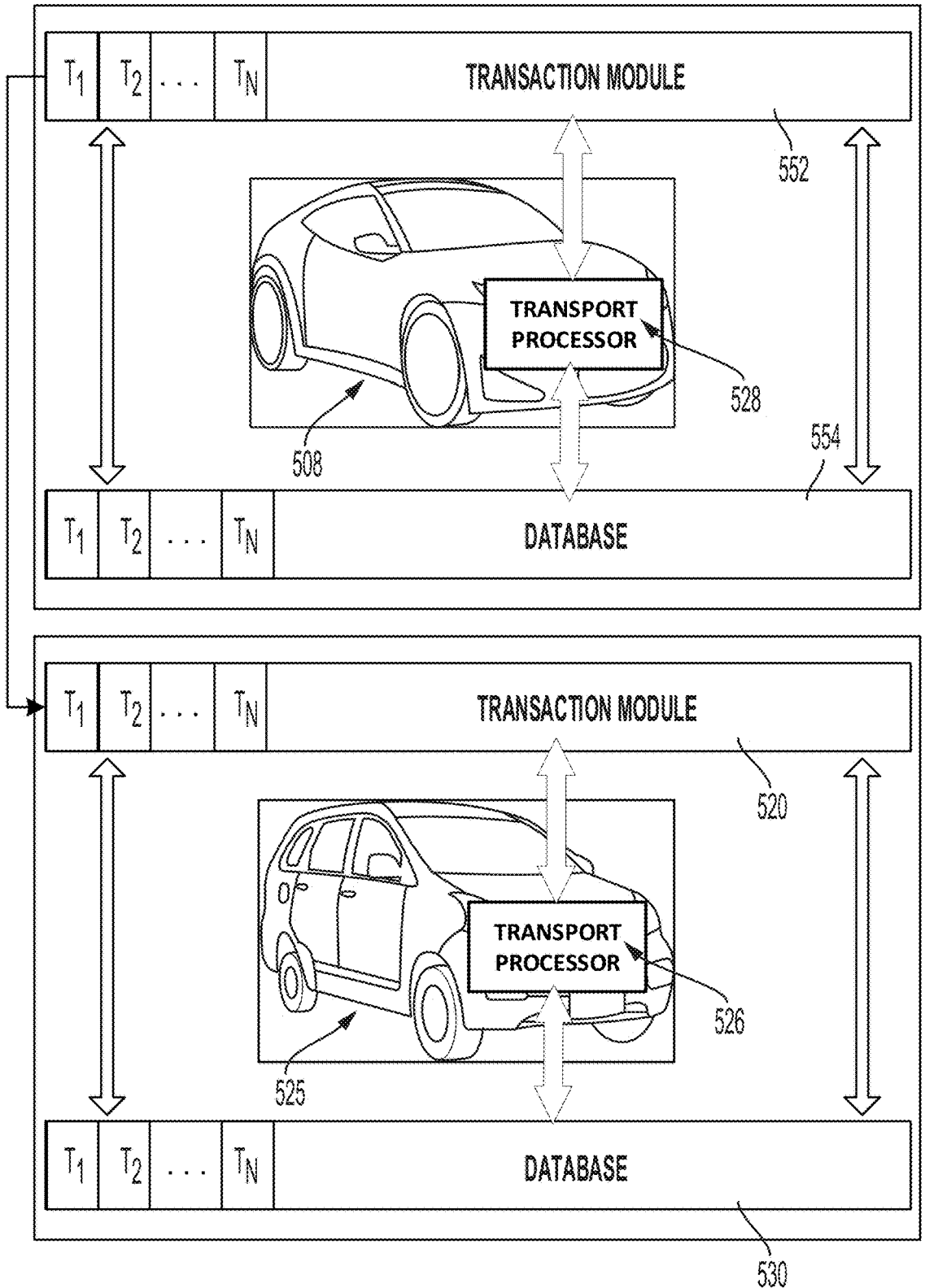
FIG. 5B illustrates another example vehicle configuration for managing database transactions conducted among various vehicles, according to example embodiments

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525, which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
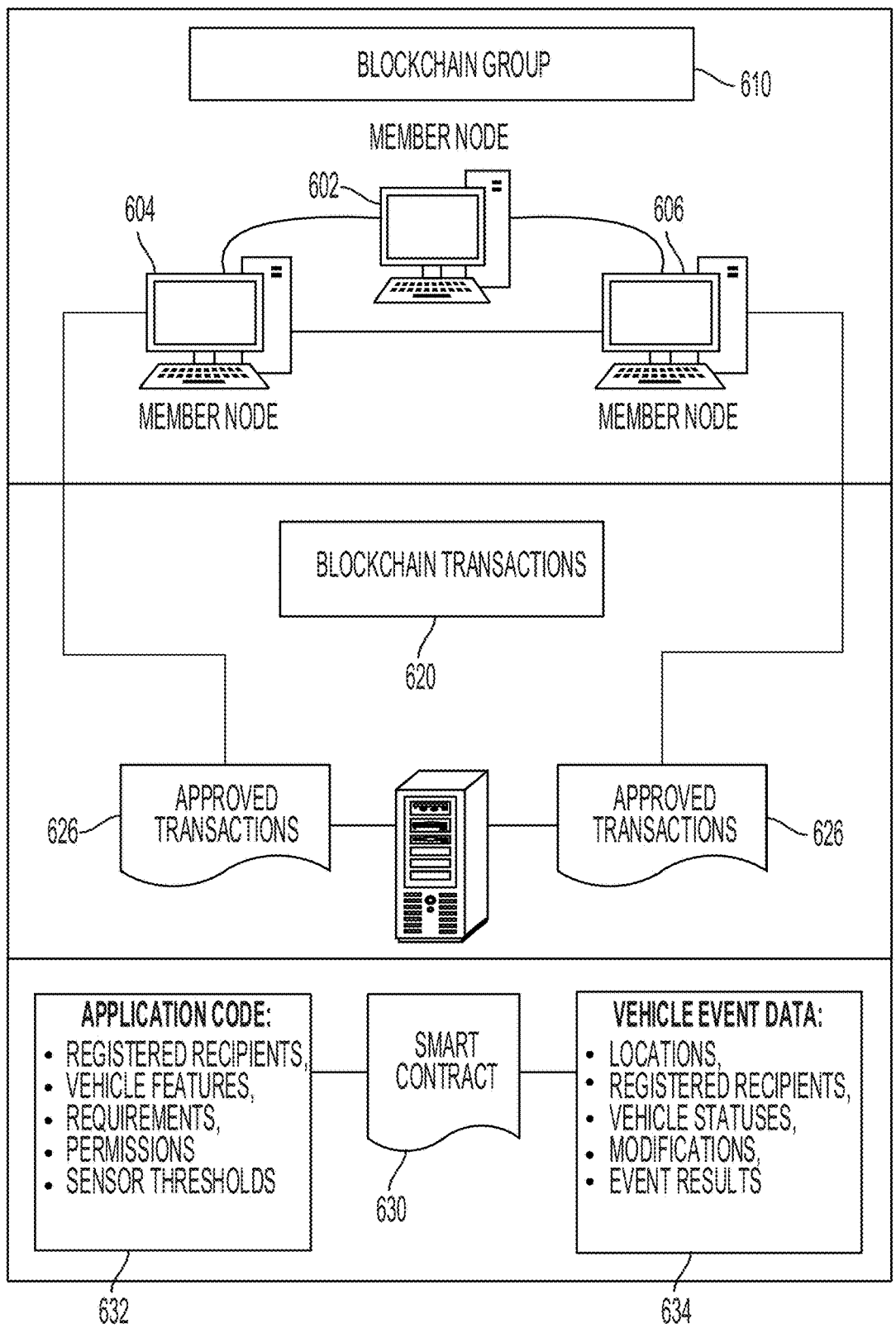
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure, which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
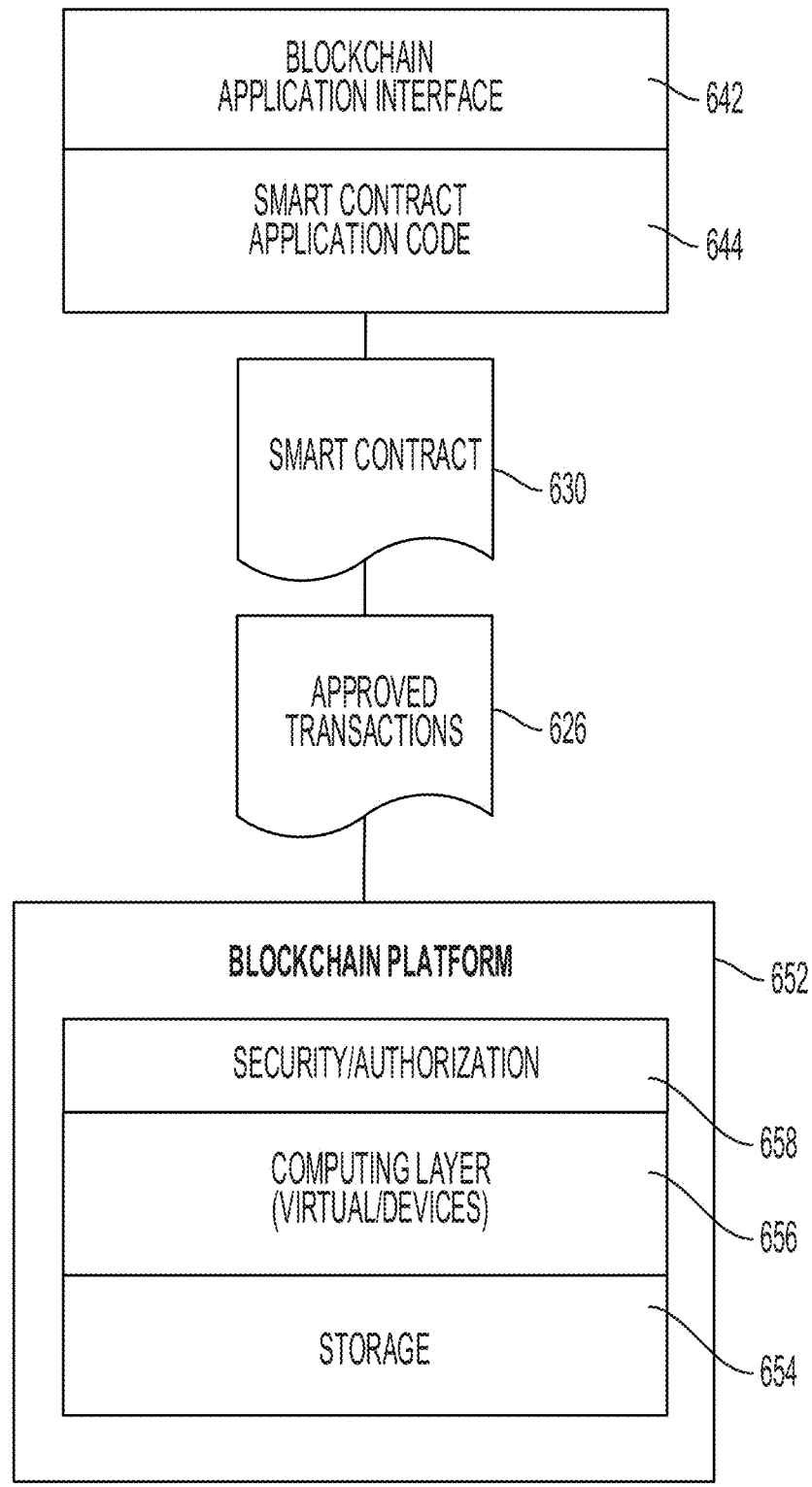
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code, which when executed causes the transaction terms and conditions to become active. The smart contract 630, when executed, causes certain approved transactions 626 to be generated, which are then forwarded to the blockchain platform 652. The platform includes a security/authorization 658, computing devices, which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features.

As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
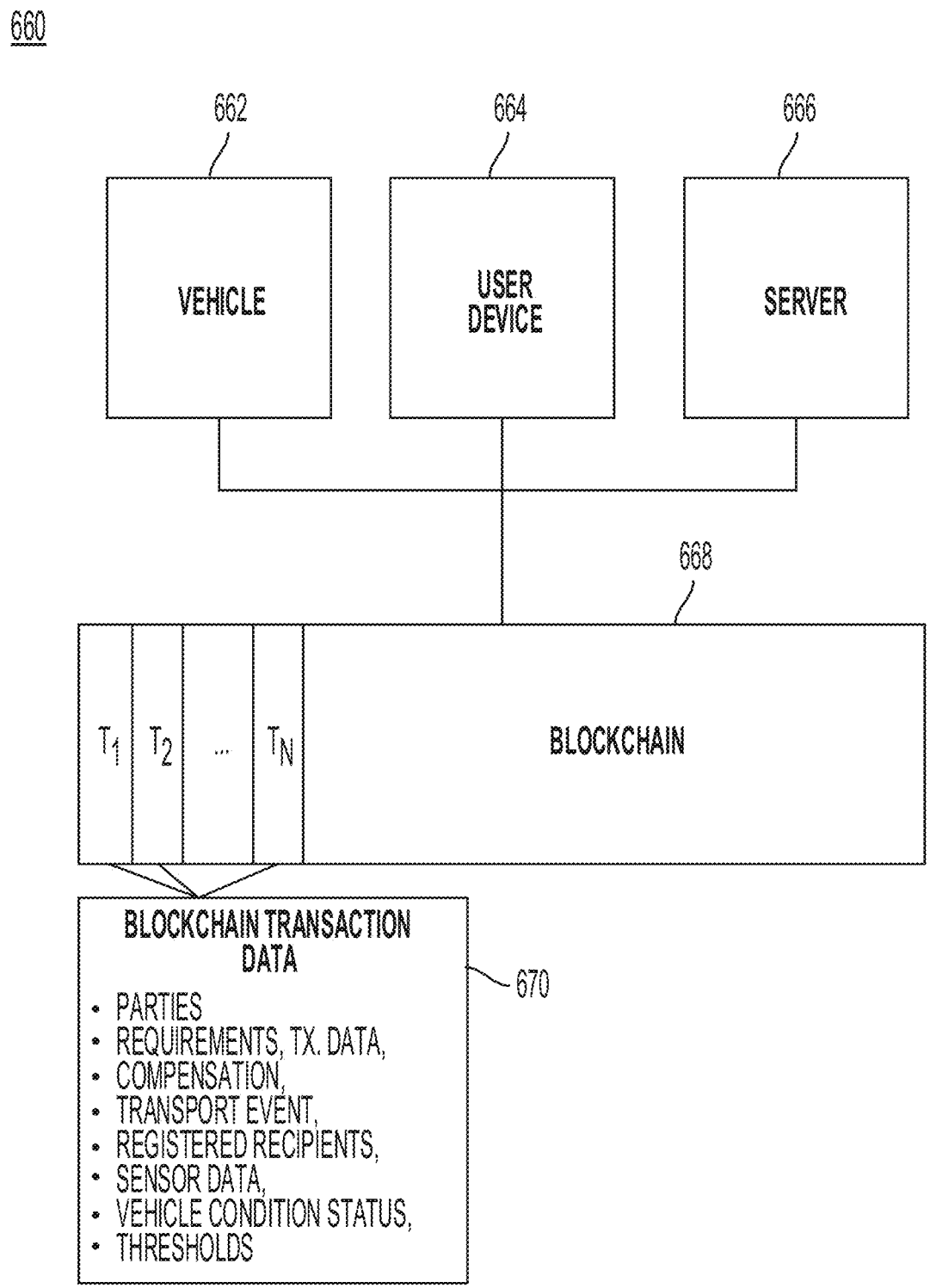
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
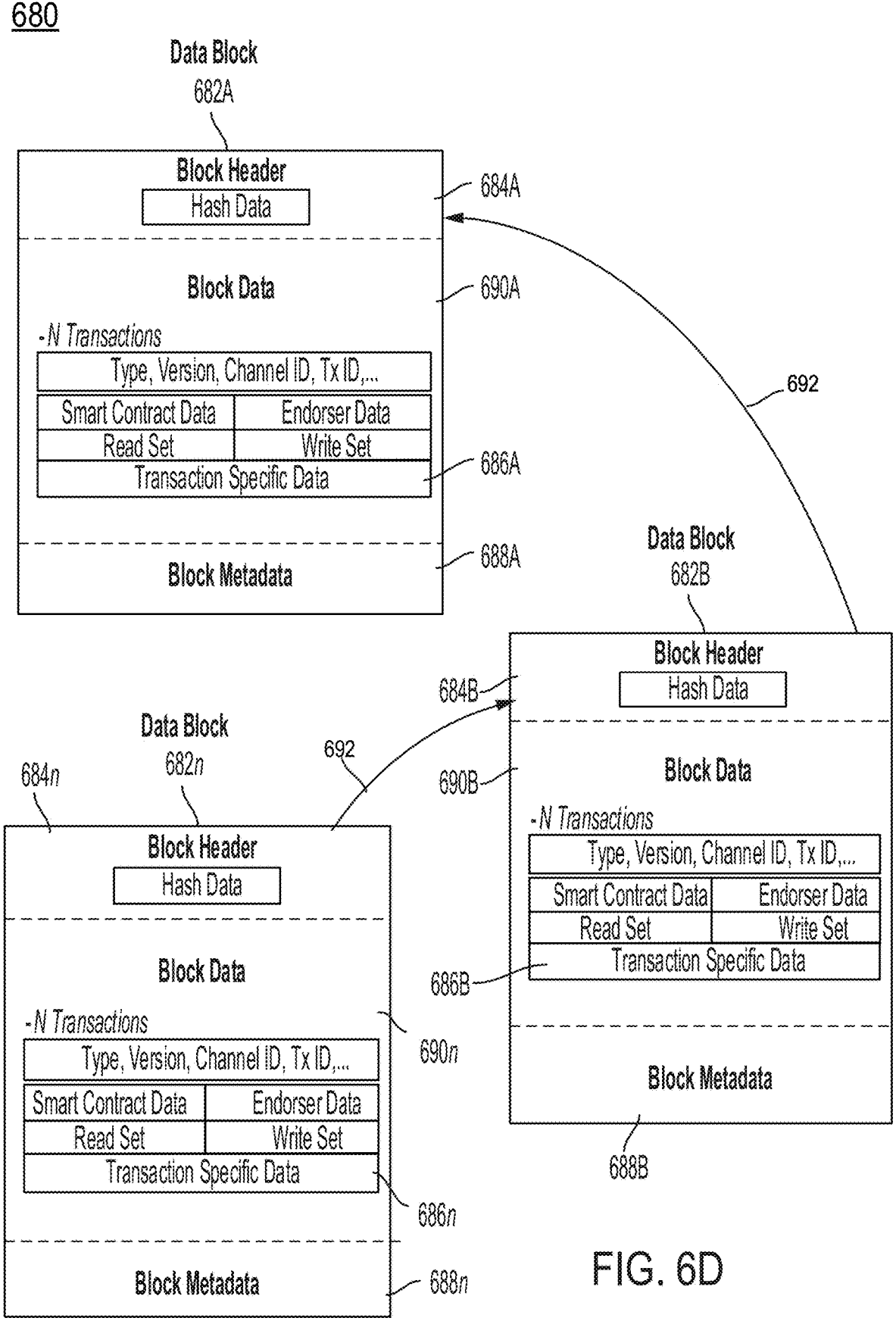
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684n, transaction specific data 686A to 686n, and block metadata 688A to 688n. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A, which stores entry data; however, this is not a requirement. The block 682A may store transactional information of N entries (e.g., 100, 500, 1000, 2000, 3000, etc.) within the block data 690A to 690*n*. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block, which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A, which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682*n* in the blockchain also have headers, files, and values. However, unlike the first block 682A, each of the headers 684A to 684*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
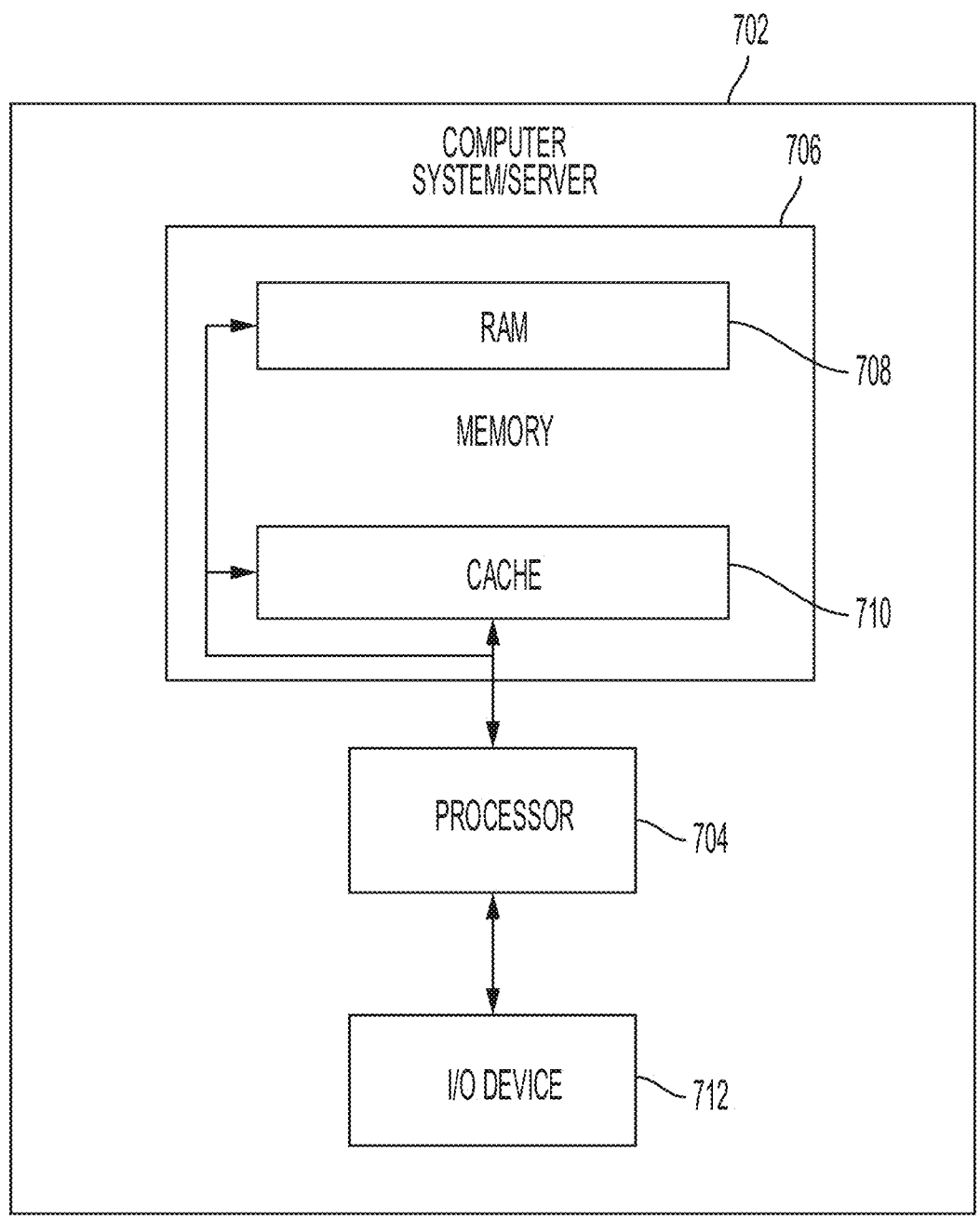
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising: maneuvering, by a Mobile Energy Storage Unit (MESU), to a transport that is: identified as available to transfer energy to the MESU based on the transport being stationary for a threshold amount of time, not currently being charged, at a distance between the transport and the MESU, and within a timeframe for the MESU to reach the transport; and retrieving, by the mobile energy storage unit, a minimum amount of energy from the transport.

2. The method of claim 1, comprising:
maneuvering, by the MESU, to another transport that previously did not have the minimum amount of energy but currently has the minimum amount of energy.

3. The method of claim 1, comprising:
determining, by the MESU, one or more of a current motion of the transport and an amount of time since the transport has been in motion.

4. The method of claim 1, comprising:
determining, by the MESU, the transport is not currently being charged when the transport is located in an area not proximate to a charging station.

5. The method of claim 1, wherein the minimum amount of energy is based on a decreasing usage related to an amount of time remaining in a period of time, and
wherein the period of time is related to a time of limited probable usage of the transport and an expiration of time remaining in the period of time.

6. The method of claim 1, comprising:
stopping, by the MESU, the retrieving when one or more the following events occur on the transport:
an opening of a door of the transport;
a utilization of a seat belt of the transport; and
an interaction with an ignition of the transport.

7. The method of claim 1, comprising:
stopping, by the MESU, the retrieving when one or more of audio and gesture from an authorized user of the transport indicates that the retrieving should stop.

8. A Mobile Energy Storage Unit (MESU), comprising: a processor configured to: maneuver the MESU to a transport that is: identified as available to transfer energy to the MESU based on the transport being stationary for a threshold amount of time, not currently in a state of charge, at a distance between the transport and the MESU, and within a timeframe for the MESU to reach the transport; and retrieve a minimum amount of energy from the transport.

9. The MESU of claim 8, wherein the processor is configured to:
maneuver to another transport that previously did not have the minimum amount of energy but currently has the minimum amount of energy.

10. The MESU of claim 8, wherein the processor is configured to:
determine one or more of a current motion of the transport and an amount of time since the transport has been in motion.

11. The MESU of claim 8, wherein the processor is configured to:
determine that the transport is not currently in a state of charge when the transport is located in an area not proximate to a charging station.

12. The MESU of claim 8, wherein the minimum amount of energy is based on a decrease of usage related to an amount of time that remains in a period of time, and
wherein the period of time is related to a time of limited probable usage of the transport and an expiration of time that remains in the period of time.

13. The MESU of claim 8, wherein the processor is configured to:
stop the retrieve when one or more the events occur on the transport:
an initiation of an open door of the transport;
a utilization of a seat belt of the transport; and
an interaction with an ignition of the transport.

14. The MESU of claim 8, wherein the processor is configured to:
stop the retrieve when one or more of audio and gesture from an authorized user of the transport indicates that the retrieve should stop.

15. A non-transitory computer readable medium comprising one or more instructions that when executed by a processor of a Mobile Energy Storage Unit (MESU) cause the MESU to perform: maneuvering, by a Mobile Energy Storage Unit (MESU), to a transport that is: identified as available to transfer energy to the MESU based on the transport being stationary for a threshold amount of time, not currently being charged, that is at a distance between the transport and the MESU, and that is within a timeframe for the MESU to reach the transport; and retrieving, by the mobile energy storage unit, a minimum amount of energy from the transport.

16. The non-transitory computer readable medium of claim 15, wherein the one or more instructions further cause the MESU to perform:
maneuvering to another transport that previously did not have the minimum amount of energy but currently has the minimum amount of energy.

17. The non-transitory computer readable medium of claim 15, wherein the one or more instructions further cause the MESU to perform: determining one or more of a current motion of the transport and an amount of time since the transport has been in motion.

18. The non-transitory computer readable medium of claim 15, wherein the one or more instructions further cause the MESU to perform: determining the transport is not currently being charged when the transport is located in an area not proximate to a charging station.

19. The non-transitory computer readable medium of claim 15, wherein the minimum amount of energy is based on a decreasing usage related to an amount of time remaining in a period of time, and
    wherein the period of time is related to a time of limited probable usage of the transport and an expiration of time remaining in the period of time.

20. The non-transitory computer readable medium of claim 15, wherein the one or more instructions further cause the MESU to perform: stopping the retrieving when one or more the following event occurs on the transport:
    an opening of a door of the transport;
    a utilization of a seat belt of the transport; and
    an interaction with an ignition of the transport.

\* \* \* \* \*